Sept. 20, 1949.  W. E. CLEMENTS  2,482,726
ADAPTER FOR SCALE TICKETS
Filed Dec. 26, 1944

INVENTOR:-
WILLIAM E. CLEMENTS
BY Arthur R. Wylie
ATTY.

Patented Sept. 20, 1949

2,482,726

UNITED STATES PATENT OFFICE 2,482,726

ADAPTER FOR SCALE TICKETS

William E. Clements, Ogden, Utah, assignor to General Mills, Inc., a corporation of Delaware Application December 26, 1944, Serial No. 569,889

3 Claims. (Cl. 101—407)

An object of this invention is to provide a ready means for stamping in multiplicate weights, both gross and tare, of loads of grain or the like as they are placed on the scale thereby avoiding chance for error as when copies are made.

Another object is to provide means for stamping weights, both gross and tare, on a relatively narrow paper strip such as can be accommodated in certain weight-registering scales, said strip however being an integral part of a larger sheet adapted to carry much additional information and from which it is partially severed so as to enable the other portion to be bent to permit the narrow strip to be inserted into the recording slot of the scale.

Still another object is the provision of a light, simple adapter for holding a group of multiplicate carbon paper sheets of this type so that any marks or impressions made on the topmost sheet are transferred to the sheets below.

Figure 1:
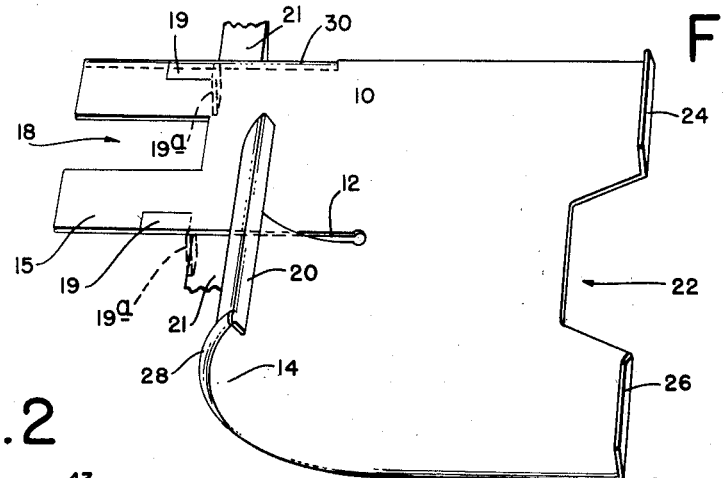
Figure 2:
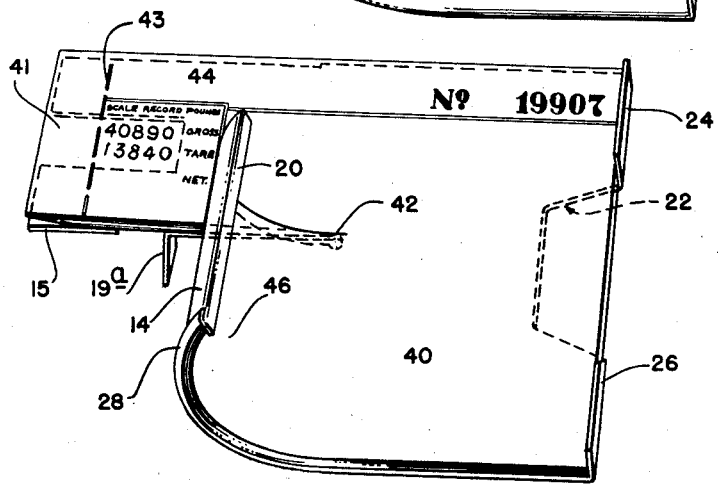
Figure 3:
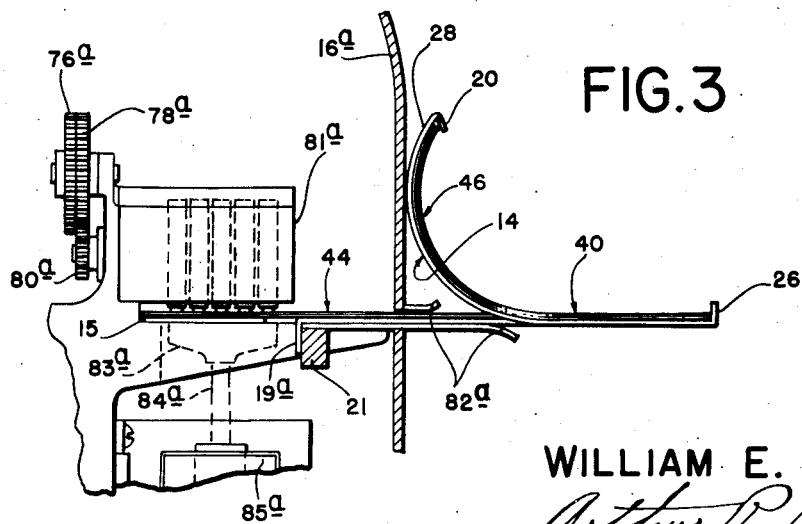

These and other objects as will hereinafter appear are accomplished by this invention which is fully described in the following specification and shown in the accompanying drawings in which Figure 1 is a perspective view of the adapter;

Fig. 2 is a similar view showing a multiplicate scale ticket in place thereon, this scale ticket having been stamped both for gross and tare; and Fig. 3 is a partial vertical section showing the adapter with the scale ticket therein in position in the weighing scale for printing.

The embodiment illustrated is shown in connection with the weighing scale of Stabler United States Patent No. 2,346,117, granted April 4, 1944. Fig. 3 is a duplicate of the portion of Fig. IV of the Stabler patent in which the elements 16a, 76a, 78a, and 80a to 85a inclusive correspond to the same parts in this patent but have the suffix a added.

In weighing machines of this type, it has been common to insert a scale ticket having a relatively narrow extension on the upper lefthand corner which receives two impressions, one for the gross weight of the grain or other material weighed, and the other for the tare. By subtracting the tare from the gross, we then have the net weight.

The word "tare" does not always have the same definition but in portions of the Rocky Mountain region, "gross" means the weight of grain and truck and "tare" means the weight of the empty truck. Thus, the driver drives on to the scale which prints on the scale ticket the gross weight of truck and grain, after which the grain is unloaded. The truck then returns and its weight is printed below the gross weight, the difference between the two being the weight of grain. This, however, does not lend itself to a multiplicate form of this scale ticket. An object of the present invention is to provide an adapter which holds a multiplicate form of the scale ticket, the sheets of which are relatively thin and carry some means for making multiplicate carbon copies of the weights so printed.

One great advantage of this system is that no errors can creep into the weights so long as the machine itself prints the correct weight. On the other hand, where copies are later made from the original scale tickets, there is always the chance that errors may creep in resulting in discrepancies and arguments as to what were the actual weights.

The present invention also enables the use of a much larger scale ticket owing to the fact that much additional information can be written or typed thereon, such as the date, the location of the weighing scale, the name of the shipper, the name of the driver, the disposition of the grain, the name of the commodity, its variety, class, grade and test, and such other information as may be desired.

In the embodiment illustrated the adapter comprises a thin flat sheet 10 of metal, plastic, or the like of a generally rectangular form which is slitted at 12 to enable a portion 14 to be curved upwardly so as to provide a relatively narrow extension or tongue 15 which is recessed at 18 to provide a space through which printing can be done as will presently be described. The outer end of the portion 14 is bent back sharply at 20 to form a retainer for the multiplicate sheets of the scale ticket which may be five or more in number. The opposite end of the adapter is preferably provided with a central notch 22 forming two spaced ends which are turned upwardly at 24, 26 so as to assist in retaining the sheets of the scale ticket in place. The sides of the extension 15 are given L-shaped cuts to form ears 19 which can be bent down as at 19a (Fig. 1) over the edge of a laterally-extending ledge 21 on the weighing scale. This prevents withdrawal of the adapter but permits it to slide sidewise. The edges of the adapter are preferably turned back to form ribs 28, 30 to increase the stiffness of the adapter, to improve its appearance and to avoid a rough edge.

In use the multiplicate scale ticket 40 is slit at 42 so as to provide an extension 44 which overlies the tongue or extension 15 of the adapter and a portion 46 which overlies the curved portion 14 of the adapter. All copies of each multiplicate scale ticket bear the same ticket number as shown in the upper righthand corner of the ticket of Fig. 2 for purposes of identification.

When it is desired to record a weight, a scale ticket is inserted in the adapter until it assumes the position of Fig. 2 with the adapter drawn to the operator's left. In this position the recess 18 in the adapter lies immediately beneath the wheels of the counter 81a. With the material to be weighed on the scale, the operator then closes a circuit energizing the solenoid 85a which thrusts a core rod 84a and the platen 83a upwardly and squeezes the scale ticket against the wheels of the counter 81a to receive an impression of the type thereon to show the weight of the material on the scale. The impression made registers the gross weight on all sheets of the scale ticket.

After dumping the grain the empty truck is again run on the scales and the same ticket again inserted into the adapter with the adapter now drawn as far to the operator's right as it will go. The impression now made registers the "tare" which in this case is the weight of the truck. Thus all copies of the ticket are given the same impressions so that the chance of error is reduced. By subtracting the tare from the gross the operator is able to get the net weight on the scale.

The sheets making up the scale ticket are all secured together in an end tab 41 which may be severed from the several sheets by tearing along a perforated tear line 43. The sheets are then loose and may be separated at will.

Thus it will be seen that I have provided a very efficient and simple means for keeping multiplicate records of loads of grain and one which reduces the possibility of error to a minimum.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. An adapter for a recording scale having a printing device, a slot for insertion of a ticket portion in register with the printing device and a ledge extending laterally of the slot, the adapter comprising a stiff sheet member having a flat extension inserted in the slot to guide a ticket portion into the slot, a portion of the adapter adjacent the extension being curved away from the slot to fold an adjoining ticket portion out of the plane of the slot, and a retaining lug on the sheet member engaging the ledge to prevent withdrawal of the adapter, the extension being narrower than the slot, and the lug having sliding engagement with the ledge for movement of the adapter laterally along the ledge to one side of the slot to record the gross weight and to the other to record the tare.

2. An adapter for a recording scale having a printing device, a slot for insertion of a ticket portion in register with the printing device, and ledge extending laterally of the slot, the adapter comprising a stiff sheet member having a tongue narrower than the slot extending therefrom inserted in the slot to guide one ticket portion into the slot, a portion of the adapter edge adjacent the extension being curved away from the slot to fold an adjoining ticket portion out of the plane of the slot, and ears extending from each side of the tongue engaging the ledge to prevent withdrawal of the adapter, the ears having sliding engagement with the ledge for movement of the adapter laterally along the ledge to one side of the slot to record the gross weight and to the other to record the tare.

3. A recording scale comprising in combination a scale having a printing device, a slot adjacent the printing device for insertion of a ticket portion in register with the printing device, a ledge extending laterally of the slot and an adapter comprising a stiff sheet member for holding multiplicate scale tickets having a tongue narrower than said slot and inserted therein to carry a portion of the tickets to register with the printing device, and a retaining ear cut from the tongue to slidingly engage the ledge to prevent withdrawal of the adapter, the adapter and scale ticket being movable along the ledge to one side of the slot to print gross weight and to the other side to print the tare, a portion of the edge adjacent the tongue being curved upwardly to fold a ticket portion out of the plane of the slot.

WILLIAM E. CLEMENTS.

REFERENCES CITED

The following references are of record in the file of this patent:

UNITED STATES PATENTS

| Number | Name | Date |
| --- | --- | --- |
| 98,154 | Doane | Dec. 21, 1869 |
| 305,122 | Walkup | Sept. 16, 1884 |
| 321,384 | Presley | June 30, 1885 |
| 601,144 | Howe | Mar. 22, 1898 |
| 636,547 | Oakley | Nov. 7, 1899 |
| 736,288 | Morton | Aug. 11, 1903 |
| 755,387 | Paul | Mar. 22, 1904 |
| 874,790 | Patterson | Dec. 24, 1907 |
| 1,071,495 | Yaw | Aug. 26, 1913 |
| 1,447,392 | Smith | Dec. 11, 1923 |
| 1,521,481 | Spencer | Dec. 30, 1924 |
| 1,681,716 | Webster | Aug. 21, 1928 |
| 1,686,924 | Oberhauser | Oct. 9, 1928 |
| 2,026,020 | Christian | Dec. 31, 1935 |
| 2,108,155 | Woolens | Feb. 15, 1938 |
| 2,276,121 | Thorn | Mar. 10, 1942 |
| 2,334,825 | Jones | Nov. 23, 1943 |
| D. 116,600 | Thorn | Sept. 12, 1939 |

FOREIGN PATENTS

| Number | Country | Date |
| --- | --- | --- |
| 202,561 | Switzerland | Apr. 17, 1939 |